US012700330B2

(12) United States Patent (10) Patent No.: US 12,700,330 B2
Dhillon et al. (45) Date of Patent: Aug. 4, 2026

(54) AUGMENTED REALITY SPEECH-TO-TEXT CAPTIONING

(71) Applicant: International Business Machines Corporation, Armonk, NY (US)

(72) Inventors: Jill S. Dhillon, Jupiter, FL (US); Jennifer M. Hatfield, Portland, OR (US); Tushar Agrawal, West Fargo, ND (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 565 days.

(21) Appl. No.: 18/337,187

(22) Filed: Jun. 19, 2023

(65) Prior Publication Data

US 2024/0420591 A1 Dec. 19, 2024

(51) Int. Cl.
| | |
|---|---|
| *G09B 21/00* | (2006.01) |
| *G06F 3/01* | (2006.01) |
| *G06F 3/16* | (2006.01) |
| *G10L 15/26* | (2006.01) |

(52) U.S. Cl.
CPC ........... *G09B 21/009* (2013.01); *G06F 3/013* (2013.01); *G06F 3/017* (2013.01); *G06F 3/167* (2013.01); *G10L 15/26* (2013.01)

(58) Field of Classification Search
CPC ....... G09B 21/009; G06F 3/013; G06F 3/017; G06F 3/167; G06F 3/011; G10L 15/26

USPC .......................................................... 434/10
See application file for complete search history.

(56) References Cited

U.S. PATENT DOCUMENTS

| | | | | |
|---|---|---|---|---|
| 10,187,512 | B2 * | 1/2019 | Singh | H04M 3/42391 |
| 10,347,254 | B2 | 7/2019 | Forutanpour | |
| 10,567,569 | B2 * | 2/2020 | Singh | G10L 25/84 |
| 10,878,819 | B1 | 12/2020 | Chavez | |
| 11,122,341 | B1 | 9/2021 | Decrop | |
| 2014/0129207 | A1 | 5/2014 | Bailey | |
| 2018/0033329 | A1 | 2/2018 | Suleiman | |
| 2018/0091643 | A1 * | 3/2018 | Singh | G06F 3/04842 |
| 2018/0098002 | A1 | 4/2018 | Peterson | |
| 2019/0132439 | A1 * | 5/2019 | Singh | H04M 3/42391 |
| 2020/0077136 | A1 | 3/2020 | Kwatra | |
| 2020/0228452 | A1 | 7/2020 | Boss | |
| 2021/0160583 | A1 | 5/2021 | Hirtzel | |
| 2022/0312128 | A1 * | 9/2022 | Rosenwein | G06V 40/166 |

OTHER PUBLICATIONS

"Captioning on Glass", downloaded from the Internet on Jan. 27, 2023, 4 pages, <https://cog.gatech.edu/>.
(Continued)

*Primary Examiner* — Pierre E Elisca
(74) *Attorney, Agent, or Firm* — Stephen R. Yoder

(57) ABSTRACT

An approach for improving communications for hearing challenged individuals. The approach captures audio communication and video communication associated with a speaker presentation. The approach converts the audio communication to text. The approach sends the text to an augmented reality (AR) device, associated with a user having hearing challenges, as captions. The approach stores the audio communication, the video communication, and the captions for replay by the user.

17 Claims, 2 Drawing Sheets

(56) References Cited

OTHER PUBLICATIONS

"IBM 5G and edge computing", downloaded from the Internet on Jan. 27, 2023, 24 pages, <https://www.ibm.com/downloads/cas/0WOR6ORJ>.

"IBM accessibility requirements—IBM Accessibility", downloaded from the Internet on Jan. 27, 2023, <https://www.ibm.com/able/requirements/requirements>, 8 pages.

"IBM Equal Access Toolkit—IBM Accessibility", downloaded from the Internet on Jan. 27, 2023, <https://www.ibm.com/able/toolkit/>, 3 pages.

Desalvo et al., "Augmented reality Head Mounted Display for viewing Closed Captioned and/or subtitled streams," An IP.com Prior Art Database Technical Disclosure, IP.com No. IPCOM000207866D, IP.com Electronic Publication Date: Jun. 15, 2011, Copyright: 2011, Sony Electronics Inc., 5 pages.

Grossi, Alexandra, "Diversely Deaf IBMers Work to Create An Accessible Future", IBM, Dec. 3, 2019, 6 pages, <https://www.ibm.com/blogs/age-and-ability/2019/12/03/diversely-deaf-ibmers-work-to-create-an-accessible-future/>.

IBM Careers Blog, "Providing an Inclusive Work Environment for the Deaf and Hearing Impaired", Dec. 11, 2019, <https://www.ibm.com/blogs/jobs/2019/12/11/providing-a-work-environment-for-the-deaf-and-hearing-impaired/>, 8 pages.

IBM, "Artificial Intelligence", IBM Research—Israel, downloaded from the Internet on Jan. 27, 2023, <https://research.ibm.com/haifa/dept/imt/index.shtml>, 9 pages.

IBM, "Natural Language Processing", IBM Research, downloaded from the Internet on Jan. 27, 2023, <https://research.ibm.com/topics/natural-language-processing>, 8 pages.

IBM, "New to accessibility", IBM Accessibility Central, downloaded from the Internet on Jan. 27, 2023, <https://pages.github.ibm.com/IBMa/able/Get_Started/New_to_Accessibility/>, 7 pages.

IBM, "Tools & automation", IBM Accessibility Central, downloaded from the Internet on Jan. 27, 2023, <https://pages.github.ibm.com/IBMa/able/Find_accessibility_tools/Find_accessibility_tools#speech-recognition>, 14 pages.

IBM, "Watson Speech to Text", downloaded from the Internet on Jan. 27, 2023, <https://www.ibm.com/cloud/watson-speech-to-text>, 9 pages.

IBM, "Watson Text to Speech", downloaded from the Internet on Jan. 27, 2023, 9 pages, <https://www.ibm.com/cloud/watson-text-to-speech>.

* cited by examiner

100

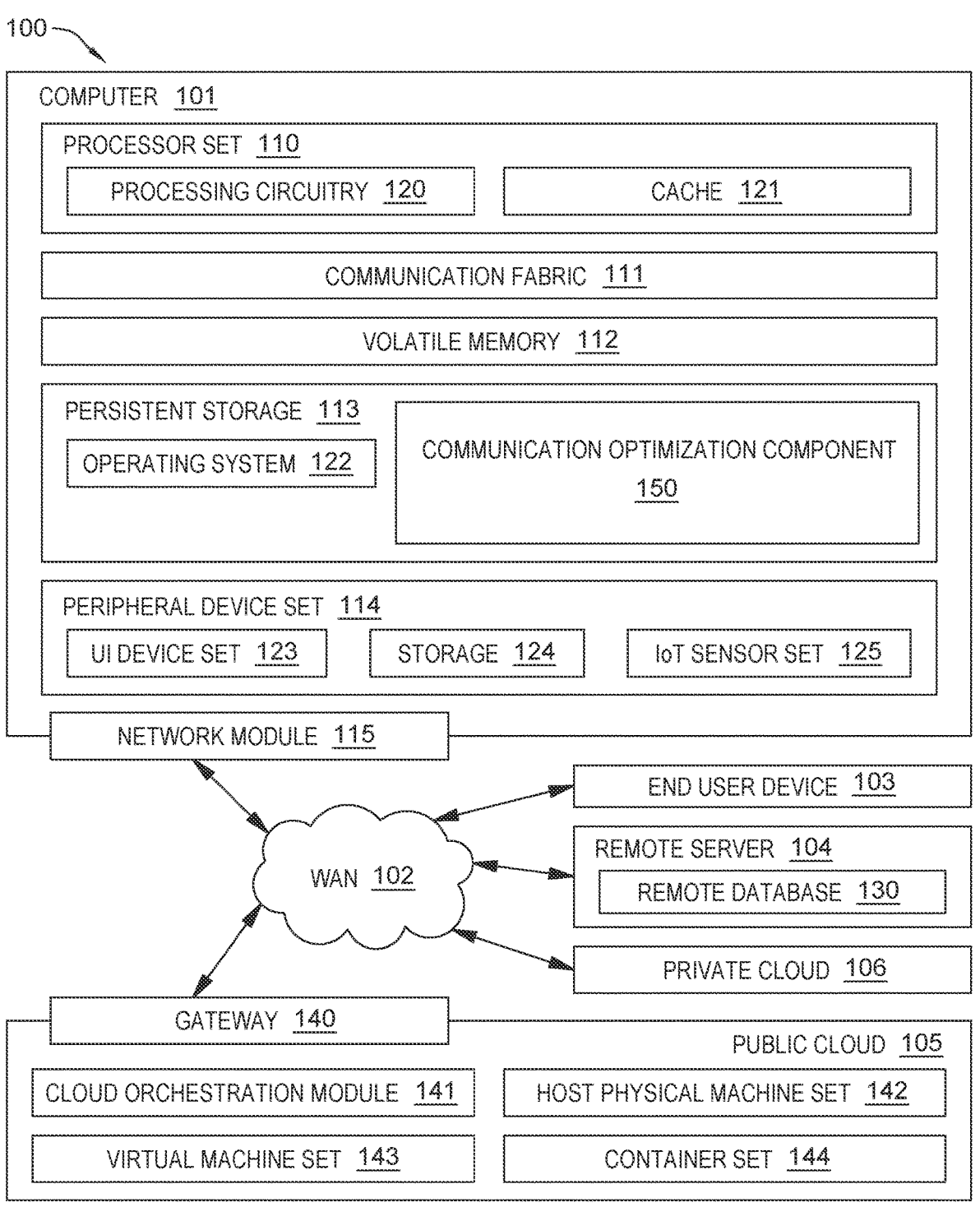

COMPUTER 101

PROCESSOR SET 110

PROCESSING CIRCUITRY 120

CACHE 121

COMMUNICATION FABRIC 111

VOLATILE MEMORY 112

PERSISTENT STORAGE 113

OPERATING SYSTEM 122

COMMUNICATION OPTIMIZATION COMPONENT 150

PERIPHERAL DEVICE SET 114

UI DEVICE SET 123

STORAGE 124

IoT SENSOR SET 125

NETWORK MODULE 115

END USER DEVICE 103

WAN 102

REMOTE SERVER 104

REMOTE DATABASE 130

PRIVATE CLOUD 106

GATEWAY 140

PUBLIC CLOUD 105

CLOUD ORCHESTRATION MODULE 141

HOST PHYSICAL MACHINE SET 142

VIRTUAL MACHINE SET 143

CONTAINER SET 144

FIG. 1

CAPTURING AUDIO COMMUNICATION AND VIDEO COMMUNICATION ASSOCIATED WITH A SPEAKER PRESENTATION ～302

CONVERT THE AUDIO COMMUNICATIONS TO TEXT ～304

SENDING THE TEXT TO AN AUGMENTED REALITY (AR) DEVICE, ASSOCIATED WITH A USER HAVING HEARING CHALLENGES, AS CAPTIONS ～306

STORING THE AUDIO COMMUNICATION, THE VIDEO COMMUNICATION, AND THE CAPTIONS FOR REPLAY BY THE USER ～308

AUGMENTED REALITY SPEECH-TO-TEXT CAPTIONING

TECHNICAL FIELD

The present invention relates generally to speech-to-text captioning, and specifically, to augmented reality accessibility of speech-to-text captioning based on iterative interactive feedback looping.

BACKGROUND

People experiencing a hearing impairment or unable to understand verbal cues in various environments, can benefit from having a textual representation of the verbal cues played back real-time in a digestible format. Hearing impaired people may prefer to have verbal communication displayed as text in a language other than the language the person is speaking. The system could interpret the language and display the text either in the same language or a different language on a real-time basis.

People of all ages are hearing impaired with hearing impairment of people generally increasing with age. Accordingly, solutions for this problem can be applied in home environments, school environments, office environments, and industrial environments, enabling hearing impaired individuals or those who want or need text-based visual communication verification available to them via real-time tools.

BRIEF SUMMARY

According to an embodiment of the present invention, a computer-implemented method for improving audio communications for hearing challenged individuals, the computer-implemented method comprising: capturing, by one or more processors, audio communication and video communication associated with a speaker presentation; converting, by the one or more processors, the audio communication to text; sending, by the one or more processors, the text to an augmented reality (AR) device, associated with a user having hearing challenges, as captions; and storing, by the one or more processors, the audio communication, the video communication, and the captions for replay by the user.

According to an embodiment of the present invention, a computer system for improving audio communications for hearing challenged individuals, the computer system comprising: one or more computer processors; one or more non-transitory computer readable storage media; and program instructions stored on the one or more non-transitory computer readable storage media, the program instructions comprising: program instructions to capture audio communication and video communication associated with a speaker presentation; program instructions to convert the audio communication to text; program instructions to send the text to an augmented reality (AR) device, associated with a user, as captions; and program instructions to store the audio communication, the video communication, and the captions for replay by the user.

According to an embodiment of the present invention, a computer-implemented method for improving communications for vision challenged individuals, the computer-implemented method comprising: capturing, by one or more processors, audio communication and video communication associated with a speaker presentation; converting, by the one or more processors, the video communication to audio and braille characters; sending, by the one or more processors, the audio to an augmented reality (AR) device, associated with a user having visual challenges, as at least one of audio or holographic braille characters; and storing, by the one or more processors, the audio communication, the video communication, and the captions for replay by the user.

According to an embodiment of the present invention, a computer program product for improving audio communications for hearing challenged individuals, the computer system comprising: one or more computer processors; one or more non-transitory computer readable storage media; and program instructions stored on the one or more non-transitory computer readable storage media, the program instructions comprising: program instructions to capture audio communication and video communication associated with a speaker presentation; program instructions to convert the audio communication to text; program instructions to send the text to an augmented reality (AR) device, associated with a user, as captions; and program instructions to store the audio communication, the video communication, and the captions for replay by the user.

According to an embodiment of the present invention, a computer system for improving communications for vision challenged individuals, the computer system comprising: one or more computer processors; one or more non-transitory computer readable storage media; and program instructions stored on the one or more non-transitory computer readable storage media, the program instructions comprising: program instructions to capture audio communication and video communication associated with a speaker presentation; program instructions to convert the video communication to audio and braille characters; program instructions to send the audio to an augmented reality (AR) device, associated with a user having visual challenges, as at least one of audio or holographic braille characters; and storing, by the one or more processors, the audio communication, the video communication, and the captions for replay by the user.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 1 depicts a cloud computing environment and a high-level architecture, in accordance with at least one embodiment of the present invention.

DETAILED DESCRIPTION

Figures 2, 3:
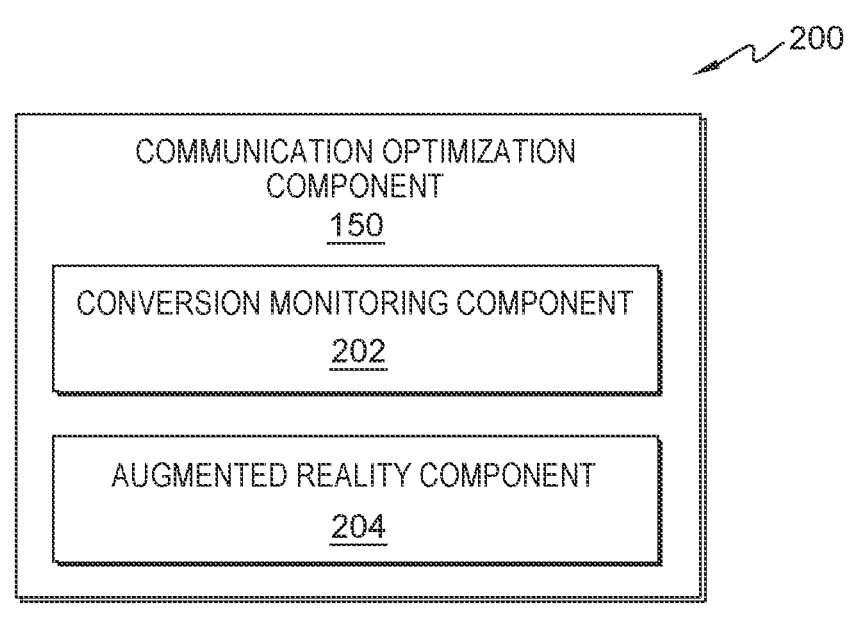
FIG. 2 depicts an exemplary detailed architecture, in accordance with at least one embodiment of the present invention.
FIG. 3 is a flowchart of a method, in accordance with at least one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Looking to FIG. 1, computing environment 100 contains an example of an environment for the execution of at least some of the computer code involved in performing the inventive methods, such as communication optimization component 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or Open Source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

FIG. 2 is an exemplary detailed architecture for performing various operations of FIG. 3, in accordance with various embodiments. The architecture 200 can be implemented in accordance with the present invention in any of the environments depicted in FIG. 1 and FIG. 3, among others, in various embodiments. Of course, more or less elements than those specifically described in FIG. 2 can be included in architecture 200, as would be understood by one of skill in the art upon reading the present descriptions.

Each of the steps of the method 300 (described in further detail below) may be performed by any suitable component of the architecture 200. A processor, e.g., processing circuit (s), chip(s), and/or module(s) implemented in hardware and/or software, and preferably having at least one hardware component, may be utilized in any device to perform one or more steps of the method 300 in the architecture 200. Illustrative processors include, but are not limited to, a central processing unit (CPU), an application specific integrated circuit (ASIC), a field programmable gate array (FPGA), etc., combinations thereof, or any other suitable computing device known in the art.

Architecture 200 provides a detailed view of at least some of the components of communication optimization component 150. Architecture 200 can comprise communication optimization component 150, which can further comprise conversation monitoring component 202 and augmented reality component 204.

Embodiments of the present invention, via communication optimization component 150, can be applied to environments including, but not limited to, home environments, school environments, office environments, industrial environments, etc. to enable hearing challenged persons or anyone desiring or requiring text-based visual communication by real-time tools. For example, embodiments of the present invention can assist persons who are, for example, deaf or hard of hearing with visual representations of auditory information. It should be noted that the text-based communication can be displayed on real-time devices such as, but not limited to, augmented reality glasses, tablets, smart watches, etc., providing a redundant, equivalent visual form.

In another aspect of an embodiment of the present invention, communication optimization component 150 can monitor speech audibly distinguishable around or directed to a user by a speaker. Embodiments of the present invention can capture one or more of video, images, speech, dialogue spoken by the speaker in real-time. In another aspect of an embodiment of the present invention, communication optimization component 150 can identify the spoken language of the speaker as well as capturing contextual information and expressions of the speaker to perform a sentiment analysis.

Further, communication optimization component 150 can convert the speech to text considering factors, such as, but not limited to target speech, source sentiment, context and environment of the speech situation and store the text in the cloud as captions associated with the speech. It should be noted that this information can also contain metadata about the speech, the speaker, the environment, the challenges of the user, the available augmented reality (AR) devices, etc.

In another aspect of an embodiment of the present invention, communication optimization component 150 can receive a request from the user, for example via a pair of AR glasses, for the text and provide the text to the user through the AR glasses. It should be noted that the text can be provided from a real-time conversion or from a previously stored conversion. Further, communication optimization component 150 can analyze a user's information in terms of listening capability, reading capability, context, spoken language, proficient languages, privileges, etc. In another aspect of an embodiment of the present invention, communication optimization component 150 can retrieve the user's stored information and metadata associated with the stored information. It should be noted that only relevant information is retrieved based on the user's privacy and security settings associated with the information, i.e., the user's privileges.

Further, the retrieved information can be translated in accordance with parameters captured for the user. In another aspect of the present invention, communication optimization component 150 can translate the retrieved information for rendering, and display the rendered information superimposed on the real-world speaker with captioning based on the user's ability to read and comprehend. It should be noted that if the information is from storage, then the captioning can be superimposed on top of the replay of the captured video.

In another aspect of an embodiment of the present invention, communication optimization component 150 can employ machine learning so the context, playback, and participants are captured for analysis and predictions to use in future engagements be with the same participants, like participants, or similar environments. For example, on the same busy street in New York, it is a recurring challenge to hear and converse with work associates when out of the office at 5 pm. The AR captioning can be used when the street noise reaches a certain level at certain times of the day, based on high traffic volumes, construction, public events, etc. It should be noted that in addition to integration with machine learning, communication optimization component 150 can be integrated with a sentiment analyzer to further enable and increase user understanding of audio content from speakers.

In one aspect of an embodiment of the present invention, conversation monitoring component 202 can provide the capability to monitor environments associated with a user wherein it may be difficult for the user to comprehend speech from speakers in the environment. It should be noted that conversation monitoring component 202 can be context and situationally attuned to detect these types of environments and change status between assisted and non-assisted based on factors such as, but not limited to, entering a challenging environment, or having environmental characteristics change in a current environment such that assistance is required after the change or no longer required after the change. It should be noted that machine learning can be enabled to predict situations where the AR glasses/technology may be required. For example, prompts for the user to use AR glasses or other preferred delivery modality can be provided when conversation monitoring component 202 predicts assistance is required. It should further be noted that augmented reality component 204 can initiate caption display based on a user's comprehension of the speaker presentation falling below a predetermined threshold.

In another aspect of an embodiment of the present invention, conversation monitoring component 202 can shift modality based on context, degree of need, situation, environment, etc. Further, conversation monitoring component 202 can follow a conversation and shift into conversational assistance, e.g., supporting captioning mode, based on dialog cadence and gaps in a conversation where it can be indicated the user does not understand the speaker.

In one aspect of an embodiment of the present invention, conversation monitoring component 202 can differentiate between users have differing comprehension capabilities. In another aspect of an embodiment of the present invention, conversation monitoring component 202 can create a corpus of user profiles and track reading speed, re-reading/revisiting passages based on gaze, and the time taken by the user to comprehend and move from one sentence to another. Conversation monitoring component 202 can use this information to optimize the user's ability to consume the captioning and improve the operation of the AR glasses while minimizing the processing power to render and display the captioning.

In one aspect of an embodiment of the present invention, conversation monitoring component 202 can provide the capability to allow role-based inclusion, making the AR experience sharable with customization to a specific role, for a specific user, for a specific temporal interval, etc. It should be noted that a role-based experience may be highly different than the user's traditional experience. It should further be noted that a role-based experience would be based on a temporary knowledge corpus, specific to the user-selected role.

In one aspect of an embodiment of the present invention, augmented reality component 204 can convert speech-to-text and display the text with unintrusive AR capability only visible to the user. In another aspect of an embodiment of the present invention, augmented reality component 204 can enable the AR based on key words spoken by the user where unobtrusive and/or undetected AR can be triggered for the user's eyes only. It should be noted that augmented reality component 204 can detect predetermined eye movement, discreet manual hand swipe gestures, or verbal commands to initiate captioning or change the modality of augmented reality component 204.

Further, augmented reality component 204 can provide the capability to allow adding security and/or privacy to the content when replayed when based on identification of content that the user indicates should be masked or filtered based on the sensitivity of the content and target user. It should be noted that augmented reality component 204 can automatically apply the security and/or privacy capability based on analysis of profiles, if available, associated with the user.

In one aspect of an embodiment of the present invention, augmented reality component 204 can also provide text-to-speech conversion for visually impaired users. In this configuration, AR can translate the text into speech and send the speech to the user's hearing device, e.g., headphones, ear buds, speakerphone, etc. In another aspect of an embodiment of the present invention, augmented reality component 204 can project holographic braille characters for the users to touch and read (with haptics). It should be noted that augmented reality component 204 can require valid security credentials before sending captions.

Looking to an example of the benefits of embodiments of the present invention, communication optimization component 150 can improve collaboration and communication between people, create more opportunities for inclusive workplaces, create better workplace employee and client experience, increase understanding and comprehension for all employees, maximize individual productivity and inclusion among peers and clients, maximize team efficiency and provide the capability to replay information as needed.

FIG. 3 is an exemplary flowchart of a method 300 for improving audio communications for hearing challenged individuals. At step 302, an embodiment can capture, via conversation monitoring component 202, audio communication and video communication associated with a speaker presentation. At step 304, the embodiment can convert, via conversation monitoring component 202, the audio communication to text. At step 306, the embodiment can send, via augmented reality component 204, the text to an augmented reality device, associated with a user having hearing challenges, as captions. At step 308, the embodiment can store, via communication optimization component 150, the audio communication, the video communication, and the captions for replay by the user.

The components described herein are identified based upon the application for which they are implemented in a specific embodiment of the invention. However, it should be appreciated that any particular component nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for improving audio communications, the computer-implemented method comprising:

capturing audio communication and video communication associated with a speaker presentation to a user;

converting the audio communication to text, the converting performed responsive to a machine learning prediction that comprehension of the audio by the user will fall below a threshold level of comprehension;

sending the text to an augmented reality (AR) device as captions for the audio communication; and displaying the captions along with the video communication on the AR device.

2. The computer-implemented method of claim 1, wherein the sending is based on receiving a request from the user to begin sending audio captions to the AR device, the request facilitating the machine learning prediction.

3. The computer-implemented method of claim 2, wherein the request is based on at least one of a predetermined eye movement or a predetermined hand swipe gesture.

4. The computer-implemented method of claim 1, wherein the converting comprises translating a language of the text generated from a spoken language associated with the speaker presentation to a proficient language associated with the user.

5. The computer-implemented method of claim 1, wherein the sending requires valid security credentials.

6. The computer-implemented method of claim 1, wherein the AR device comprises at least one of glasses, a mobile phone, a tablet computer or a smart watch.

7. The computer-implemented method of claim 1, wherein the converting is further performed based on factors comprising at least one of the audio communication, speaker sentiment, context of the audio communication, and environment of the audio communication.

8. The computer-implemented method of claim 1, further comprising:

storing the audio communication, the text, and the video communication for replay.

9. The computer-implemented method of claim 8, further comprising:

responsive to a request to replay the audio and video communications, rendering the stored text as audio captions superimposed on top of the video communication.

10. A computer system for improving audio communications, the computer system comprising:

one or more computer processors;

one or more non-transitory computer readable storage media; and program instructions stored on the one or more non-transitory computer readable storage media, the program instructions comprising:

program instructions to capture audio communication and video communication associated with a speaker presentation to a user;

program instructions to convert, responsive to a machine learning prediction that comprehension of the audio by the user will fall below a threshold level of comprehension, the audio communication to text;

program instructions to send the text to an augmented reality (AR) device as captions for the audio communication; and program instructions to display the captions along with the video communication on the AR device.

11. The computer system of claim 10, wherein the sending is based on receiving a request from the user to begin sending audio captions to the AR device, the request facilitating the machine learning prediction.

12. The computer system of claim 11, wherein the request is based on at least one of a predetermined eye movement or a predetermined hand swipe gesture.

13. The computer system of claim 10, wherein the converting comprises translating a language of the text generated from a spoken language associated with the speaker presentation to a written language associated with the user according to the user comprehension of the spoken language.

14. The computer system of claim 10, wherein the sending requires valid security credentials.

15. The computer system of claim 10, wherein the AR device comprises at least one of glasses, a mobile phone, a tablet computer or a smart watch.

16. The computer system of claim 10, wherein the converting is further performed based on factors comprising at least one of the audio communication, speaker sentiment, context of the audio communication, and environment of the audio communication.

17. A computer program product for improving audio communications, the computer program product comprising:

one or more computer readable storage media; and program instructions stored on the one or more computer readable storage media, the program instructions comprising:

program instructions to capture audio communication and video communication associated with a speaker presentation to a user;

program instructions to convert, responsive to a machine learning prediction that comprehension of the audio by the user will fall below a threshold level of comprehension, the audio communication to text;

program instructions to send the text to an augmented reality (AR) device as captions for the audio communication; and program instructions to display the captions along with the video communication on the AR device.

\*     \*     \*     \*     \*